United States Patent Office 2,816,851
Patented Dec. 17, 1957

2,816,851

DECORATIVE LAMINATE CONTAINING A TRANSPARENT PRINTED OVERLAY SHEET

Hanns F. Arledter, Stockbridge, Mass., assignor to Hurlbut Paper Company, South Lee, Mass., a corporation of Massachusetts No Drawing. Application July 27, 1956,
Serial No. 600,412

9 Claims. (Cl. 154—47)

The present invention relates to laminates, and more particularly to decorative laminates containing a transparent overlay sheet which may be printed upon its lower surface.

A decorative laminate, such as that used in forming table tops or counters, contains a plurality of layers of core stock which generally are plies of paper, such as kraft paper, or of wood bonded together with from about 32% to about 40% of a laminating resin. On the upper surface of the core stock there is located a sheet of absorbent paper generally containing from about 40% to about 60% of a laminating resin to bind it to the core stock. This absorbent paper must be opaque in order that the colored core stock will not show through the absorbent paper. In most laminates the upper surface of this absorbent paper is printed with a decorative design, such as a wood grain design. On top of the absorbent paper there is located an overlay sheet generally containing from about 50% to about 80% of a laminating resin to bind it to the absorbent paper. This overlay sheet must be transparent in order that the decorative design printed upon the absorbent paper will show through the overlay sheet. The function of the overlay sheet is to protect the printed surface of the absorbent paper from abrasion.

A decorative laminate, such as that used in forming dinnerware, ash trays and other irregular shaped objects, contains a base layer of resin molded or pressed into the desired shape and covered with a transparent overlay sheet which may be printed on its lower surface.

Decorative laminates have been made heretofore wherein the upper surface of the absorbent paper is printed with a decorative design and the absorbent paper covered with a transparent paper overlay sheet composed entirely of alpha-cellulose or refined cellulose fibers. Also decorative laminates have been prepared wherein the absorbent paper contains the printed design on its upper surface and is covered by a transparent paper overlay sheet consisting of 50–80% viscose rayon and 50–20% respectively of rag stock or cellulose. It is also known to print the lower surface of the overlay paper with the desired decorative design. Such decorative laminates, however, suffer from many drawbacks. While some of the necessary properties of a decorative laminate may exist therein, not all of the desirable properties are present simultaneously. For example, in the decorative laminates the overlay sheet may have only a fair resistance to crazing tendency, poor printability, fair flakiness, and small tear strength. The major drawback to such decorative laminates is the fact that they are incapable of being molded satisfactorily to conform to irregular shaped objects.

In the formation of decorative laminates for irregular shaped objects, for example, dinnerware or ash trays, it is desirable that the printed design appear not upon the upper surface of the absorbent paper but rather upon the lower surface of the transparent overlay sheet. The formation of such a decorative laminate, however, is fraught with many problems which have not been solved heretofore.

Accordingly, it is an object of the present invention to provide a decorative laminate containing a transparent paper overlay sheet which may be printed upon its lower surface, the decorative laminate being capable of being readily molded to conform to irregular shaped objects. In addition, it is an object of the invention to provide a decorative laminate having a transparent overlay sheet which possesses all of the necessary properties, not just some of them.

The decorative laminate of the invention does satisfy all of the above objects. In the decorative laminate the overlay sheet shows very good to excellent transparency. The decorative laminate also shows good to excellent resistance to crazing tendency of the overlay sheet, the crazing tendency of a decorative laminate being determined by alternately exposing it to 15 minutes of steam and then 15 minutes of dry heat at 105° C. and then testing the surface thereof for creases and cracks after each treating cycle. The decorative laminate has very good to excellent printability of the transparent overlay sheet. The decorative laminate has very good to excellent moldability, i. e., when the laminate is molded over irregular surfaces and sharp edges, the printed design upon the lower surface of the overlay sheet at the points of stress remains sharp and clear. Furthermore, the decorative laminate shows no flakiness, since the laminating resin penetrates into the overlay sheet and does not stay on the surface where it may be readily scraped off as flakes. The decorative laminate also meets the standards of the industry in regard to abrasion resistance in that it takes more than four hundred Tabor abrasion cycles to abrade the overlay sheet and part of the printed design on the lower surface thereof.

The decorative laminate of the invention contains the conventional plurality of plies of core stock such as kraft paper or wood, generally impregnated with from about 32% to about 40% of a laminating resin and having on the upper surface thereof an opaque absorbent paper, such as a cellulosic fiber paper filled with opacifying fillers, bonded thereto with a laminating resin, generally from about 40% to about 60% of the resin being employed in the absorbent paper. On top of the absorbent paper there is a transparent overlay sheet which may be printed on its lower surface and bonded to the absorbent paper by from about 50% to about 80% of a laminating resin. The transparent overlay sheet consists in general of an interfelted fibrous web of cellulose fibers, long rayon fibers, glass fibers, and a laminating resin.

The decorative laminate of the invention may contain a base layer of resin molded or pressed into the desired shape and covered with the transparent overlay sheet.

The cellulose fibers are of papermaker length, i. e., less than 6 millimeters in length, and may be, for example, fibers of alpha-cellulose, rag, cotton, or linen.

The rayon fibers are viscose rayon or cuprammonium rayon fibers, the other forms of rayon fibers, namely nitrocellulose rayon and cellulose acetate, being unsuitable. The rayon fibers must have a denier less than about 1.5, and preferably in the range from about 0.5 to about 0.75. This size of rayon fibers is essential in order to eliminate any crazing tendency of the overlay sheet in the decorative laminate. The larger size rayon fibers show a marked crazing tendency. In addition, the rayon fibers must have a length greater than about 6 millimeters, and preferably in the range from about 6 millimeters to about 12 millimeters. The long rayon fibers are essential in order to impart to the overlay sheet of the decorative laminate high tear strength, stretch, fold, and wet and dry bursting strengths so that the overlay sheet does not part when the decorative laminate is molded over irregular curves and edges. The long rayon fibers are also necessary in order to impart to the overlay sheet of the laminate the desired properties of bulk, reduced flakiness, transparency, air resistance, treating speed, resin pickup, and dimensional stability of the laminate surface.

The glass fibers in the transparent overlay sheet of the decorative laminate must have a diameter in the range from about 0.2 micron to about 2 microns in order to impart the desired printability to the overlay sheet and to prevent crazing of the overlay sheet in the decorative laminate. Larger size glass fibers do not impart to the overlay sheet of the laminate the desired properties of printability and resistance to crazing tendency. The glass fibers also impart to the overlay sheet improved structure and surface characteristics and enable the production of a more uniform paper.

The cellulose fibers and the rayon fibers are capable of being transparentized by the laminating resin, the glass fibers being sufficiently transparent prior to incorporation of the laminating resin.

A laminating or molding resin is any liquid resin which by the use of heat and/or catalysts is converted into a solid infusible mass. Typical examples of such suitable laminating resins which do transparentize the fibrous content of the overlay sheet are melamine formaldehyde resins, phenol formaldehyde resins, diallylphthalate polymers sold under the trade name "DAP," and polyester resins, such as unsaturated organic compounds made by the reaction between hexamethylene glycol or ethylene glycol and maleic acid or adipic acid containing a plurality of ester groupings which can be polymerized alone or copolymerized with other unsaturated monomers like styrene to give 3-dimensional cross linked structures.

The transparent overlay sheet in the decorative laminate of the invention containing cellulosic fibers, rayon fibers, glass fibers, and a laminating resin may exist in two forms. In one form the transparent overlay sheet contains from about 50% to about 85% of cellulose fibers of papermaker length, i. e., less than about 6 millimeters; from about 50% to about 15% respectively of rayon fibers, i. e., viscose rayon and cuprammonium rayon fibers, having a length greater than about 6 millimeters, and preferably from about 6 to about 12 millimeters, and a denier of less than about 1.5, and preferably in the range from about 0.5 to about 0.75; and from about 5% to about 20% based on the weight of rayon and cellulose fibers of glass fibers having a diameter of from about 0.2 to about 2 microns. In the second form the transparent overlay sheet contains from about 70% to about 100% of rayon fibers, i. e., viscose rayon or cuprammonium rayon fibers, having a denier of less than about 1.5, and preferably in the range from about 0.5 to about 0.75 denier, of which rayon fibers from about 15% to about 50% have a length greater than about 6 millimeters, and preferably from about 6 millimeters to about 12 millimeters; from about 30% to about 0% respectively of cellulosic fibers; and from about 2% to about 25% based on the weight of rayon and cellulose fibers of glass fibers having a diameter of from about 0.2 to about 2 microns. As noted above in both forms of the transparent overlay sheet the lower surface of the sheet may be printed with a decorative design, such as a wood grain pattern, and the sheet is impregnated with from about 50% to about 80% of a laminating resin.

The transparent overlay sheet used in the decorative laminate is formed in the conventional paper-making manner by forming an aqueous slurry of the fiber stock and then forming the paper upon the wire of a paper machine, such as Fourdrinier machine, dewatering, drying, and calendering. The overlay sheet may then be printed in a printing press with a decorative design and subsequently impregnated with from about 50% to about 80% of a laminating resin to transparentize the cellulose fibers and the rayon fibers. The decorative laminate is then formed by arranging the impregnated plies of core stock, absorbent paper, and overlay sheet in the form of a laminate and laminating the same under heat and pressure, for example, at 300° F. and 1,000 pounds per square inch.

The decorative laminate of the invention will be further illustrated by the following examples.

EXAMPLE 1

Sixty grams of viscose rayon fibers having a denier of 0.75 were beaten in a papermaker beater together with 25 grams of rag cellulose to papermaker length at 3% stock consistency. The beaten stock was diluted to a stock consistency of 10 grams per liter and 0.5 gram of polyethyleneimine then added thereto. Ten grams of glass fibers having a diameter of 0.75 microns were dispersed in 10,000 grams of water together with 20 grams of viscose rayon fibers having a denier of 0.75 and a length of 6 millimeters. Both fiber slurries were mixed together and the stock further diluted to 1.5 grams per liter. A paper of 28 pound basis weight (24 inches by 36 inches—500 sheets) was formed on the wire of a paper machine, dewatered, dried, and calendered to a thickness of 4 mils and an apparent density of 7.5. The overlay paper thus formed was then printed with a decorative wood grain design and impregnated with 60% by weight of melamine formaldehyde resin. The overlay sheet was then incorporated in a decorative laminate by forming a laminated structure containing six plies of kraft paper containing 35% of melamine formaldehyde resin as the core stock and a sheet of filled cellulose absorbent paper containing 60% of melamine formaldehyde resin imposed upon the top of the core stock, the transparent overlay sheet being placed upon the top of the absorbent paper with the printed surface of the overlay sheet in contact with the absorbent paper. The resin content of the laminate was then cured to bond the plies together by heating the laminated structure at a temperature of 300° F. and under a pressure of 1,000 pounds per square inch in a press. A decorative laminate was formed thereby having a transparent overlay sheet printed on its lower surface as the top ply thereof, the overlay sheet consisting of a paper containing 81% of viscose rayon fibers having a denier of 0.75 of which viscose rayon fibers 19% had a length of 6 millimeters, 19% of rag cellulose fibers of papermaker length, and 7.7% based on the weight of the cellulose and rayon fibers of glass fibers having a diameter of 0.75 microns, the overlay sheet also containing 60% of melamine formaldehyde resin.

EXAMPLE 2

Sixty-eight parts of alpha-cellulose fibers were beaten to a beating degree of 28° S. R. in 1500 parts of water and the stock diluted to 4000 parts of water. Two parts of glass fibers having a diameter of 0.75 microns and 6 parts of glass fibers having a diameter of 1.25 microns were dispersed in 20,000 parts of water together with 24 parts of precut viscose rayon fibers having a denier of 0.5 and a length of 9 millimeters. The aqueous slurry of cellulose fibers, glass fibers, and viscose rayon fibers was agitated and the slurry fed to the wire of a paper machine and a 28 pound weight paper (24 inches by 36 inches— 500 sheets) formed by dewatering, drying, and calendering. The resulting overlay sheet was then printed on one surface with a decorative wood design and impregnated with 70% by weight of melamine formaldehyde resin. The overlay sheet was then incorporated into a decorative laminate using the same core stock and absorbent paper as was used in Example 1, the printed surface of the overlay sheet being next to the absorbent paper and the laminate being formed by applying heat and pressure to the plurality of plies at a temperature of 300° F. and a pressure of 1,000 pounds per square inch. The decorative laminate so formed contained a transparent overlay sheet printed on its lower surface as the top ply thereof, the overlay sheet containing 73% of alpha-cellulose fibers of papermaker length, 27% of viscose rayon fibers having a length of 9 millimeters and a denier of 0.5, 8.3% based on the weight of the cellulose fibers and the rayon fibers of glass fibers having a diameter of 0.75 and 1.25 microns, and 70% of melamine formaldehyde resin.

EXAMPLE 3

Sixty-five grams of 0.75 denier viscose rayon fibers were beaten to papermaker length and the stock diluted to 2 grams per liter. Five grams of glass fibers having a diameter of 0.75 micron were added to the slurry along with 30 grams of viscose rayon fibers having a length of 4.5 millimeters, 10 grams of viscose rayon fibers having a length of 6.5 millimeters, 5 grams of viscose rayon fibers having a length of 9 millimeters, and 5 grams of viscose rayon fibers having a length of 12.5 millimeters, all of the viscose rayon fibers having a denier of 0.75. An overlay paper was manufactured in the conventional manner at 1.5 grams per liter stock consistency. Bonding of the fibers in the overlay paper was achieved by spraying thereon a 3.5% solution of a melamine formaldehyde resin soluble in a mixture of 10 parts alcohol and 90 parts water while the paper was on the wire of the paper machine. The melamine formaldehyde resin was precured with the aid of a short time exposure to infrared heat of 350°–400° F. for about 2 seconds after the drying of the paper. The overlay paper was then printed with a decorative wood grain design and impregnated with 75% of melamine formaldehyde resin. The overlay paper was incorporated in a decorative laminate having the same core stock and absorbent paper as used in Example 1 by bonding the plies of the laminate together at a temperature of 300° F. and a pressure of 1,000 pounds per square inch. The decorative laminate so formed contained a transparent overlay sheet printed on its lower surface as the top ply thereof and containing 100% of viscose rayon fibers of 0.75 denier of which viscose rayon fibers 17.4% had a length greater than 6 millimeters, 4.2% based on the weight of the rayon fibers of glass fibers having a diameter of 0.75 micron, and 75% of melamine formaldehyde resin as the laminating resin.

The properties of the overlay sheet in the decorative laminate of Example 2 illustrating the first form of the overlay sheet and the properties of the overlay sheet in the decorative laminate of Example 1 illustrating the second form of the overlay sheet were compared with the properties of the two heretofore known overlay sheets of decorative laminates. Thus they were compared with overlay paper A containing 100% alpha-cellulose and overlay paper B containing 60% viscose rayon fibers and 40% rag stock. The results of the tests are set forth in Table I below.

invention are far superior to heretofore known decorative laminates in that they contain a transparent overlay sheet which may be printed and which meets every key test essential for overlay papers for the decorative laminating industry.

Various modifications and changes may be made in the invention herein set forth without departing from the spirit thereof and accordingly the invention is to be limited only within the scope of the appended claims.

I claim:

1. A decorative laminate having a transparent overlay sheet as the top ply thereof, said overlay sheet consisting of an interfelted fibrous web of from about 50% to about 85% of cellulose fibers, from about 50% to about 15% respectively of rayon fibers selected from the group consisting of viscose rayon and cuprammonium rayon fibers having a length greater than about 6 millimeters and a denier of less than about 1.5, from about 5% to about 20% based on the weight of the cellulose fibers and the rayon fibers of glass fibers having a diameter of from about 0.2 to about 2 microns, and impregnated with from about 50% to about 80% of a laminating resin.

2. A decorative laminate having a transparent overlay sheet as the top ply thereof, said overlay sheet consisting of an interfelted fibrous web of from about 50% to about 85% of cellulose fibers of papermaker length, from about 50% to about 15% respectively of rayon fibers selected from the group consisting of viscose rayon and cuprammonium rayon fibers having a length of from about 6 millimeters to about 12 millimeters and a denier in the range from about 0.5 to about 0.75, from about 5% to about 20% based on the weight of the cellulose fibers and rayon fibers of glass fibers having a diameter of from about 0.2 microns to about 2 microns, and impregnated with from about 50% to about 80% of a laminating resin.

3. A decorative laminate as set forth in claim 2 wherein the transparent overlay sheet is impregnated with a melamine formaldehyde laminating resin.

4. A decorative laminate as set forth in claim 2 wherein the transparent overlay sheet is impregnated with a phenol formaldehyde laminating resin.

5. A decorative laminate as set forth in claim 2 wherein the transparent overlay sheet is printed on its lower surface.

6. A decorative laminate having a transparent overlay sheet as the top ply thereof, said overlay sheet consisting of an interfelted fibrous web of from about 70% to about 100% of rayon fibers selected from the group consisting of viscose rayon and cuprammonium rayon fibers having a denier of less than about 1.5, of which rayon fibers from about 15% to about 50% have a length greater than about 6 millimeters; from about 30% to about 0% respectively of cellulose fibers; from about 2% to about 25% based on the weight of the cellulose fibers and the rayon fibers of glass fibers having a diameter of from about 0.2 microns

*Table I*

| Properties | Overlay A | Overlay B | Overlay of Example 2 | Overlay of Example 1 |
| --- | --- | --- | --- | --- |
| Transparency | excellent | good | very good | excellent. |
| Resistance to Crazing Tendency | fair | do | good | Do. |
| Printability | good | fair | very good-excellent. | Do. |
| Moldability | poor-fair | poor-fair | do | very good-excellent. |
| Average Abrasion Cycles on Overlay Printed Design Laminate | 350–390 | 319–350 | 422–480 | 440–510. |
| Print Color Strike-Through | strong | severe | slight | slight. |
| Flakiness | some | fair | none | none. |
| Treatability | excellent | good | very good | excellent. |
| Tear, g. (basis weight 28 pounds—24 inches by 36 inches—500 sheets) | 32–42 | 35–45 | 80–120 | 77–128. |
| Percent Resin Pickup of a 50% melamine formaldehyde resin solution | 71–73 | 68–69 | 68–76 | 72–80. |
| Castor Oil Penetration rate, Seconds 80° F. | 1.8–2.4 | 2.6–3.4 | 2.0–2.8 | 1.0–2.4. |

From a study of the data presented above in Table I it is readily apparent that the decorative laminates of the to about 2 microns; and impregnated with from about 50% to about 80% of a laminating resin.

7. A decorative laminate having a transparent overlay sheet as the top ply thereof, said overlay sheet consisting of an interfelted fibrous web of from about 70% to about 100% of rayon fibers selected from the group consisting of viscose rayon and cuprammonium rayon fibers having a denier in the range from about 0.5 to about 0.75, of which rayon fibers from about 15% to about 50% have a length in the range from about 6 millimeters to about 12 millimeters, from about 30% to about 0% respectively of cellulose fibers of papermaker length, from about 2% to about 25% based on the weight of the rayon fibers and cellulose fibers of glass fibers having a diameter of about 0.2 microns to about 2 microns, and impregnated with from about 50% to about 80% of a laminating resin.

8. A decorative laminate as set forth in claim 7 wherein the transparent overlay sheet is impregnated with a melamine formaldehyde laminating resin.

9. A decorative laminate as set forth in claim 7 wherein the transparent overlay sheet is impregnated with a phenol formaldehyde laminating resin.

References Cited in the file of this patent

UNITED STATES PATENTS

| | | |
|---|---|---|
| 2,496,665 | Hermanson | Feb. 7, 1950 |
| 2,563,111 | Hampson et al. | Aug. 7, 1951 |
| 2,605,205 | Patterson et al. | July 29, 1952 |
| 2,631,960 | Dafter | Mar. 17, 1953 |
| 2,740,737 | Elmer et al. | Apr. 3, 1956 |

FOREIGN PATENTS

| | | |
|---|---|---|
| 147,934 | Australia | Aug. 26, 1952 |